Figure 1:
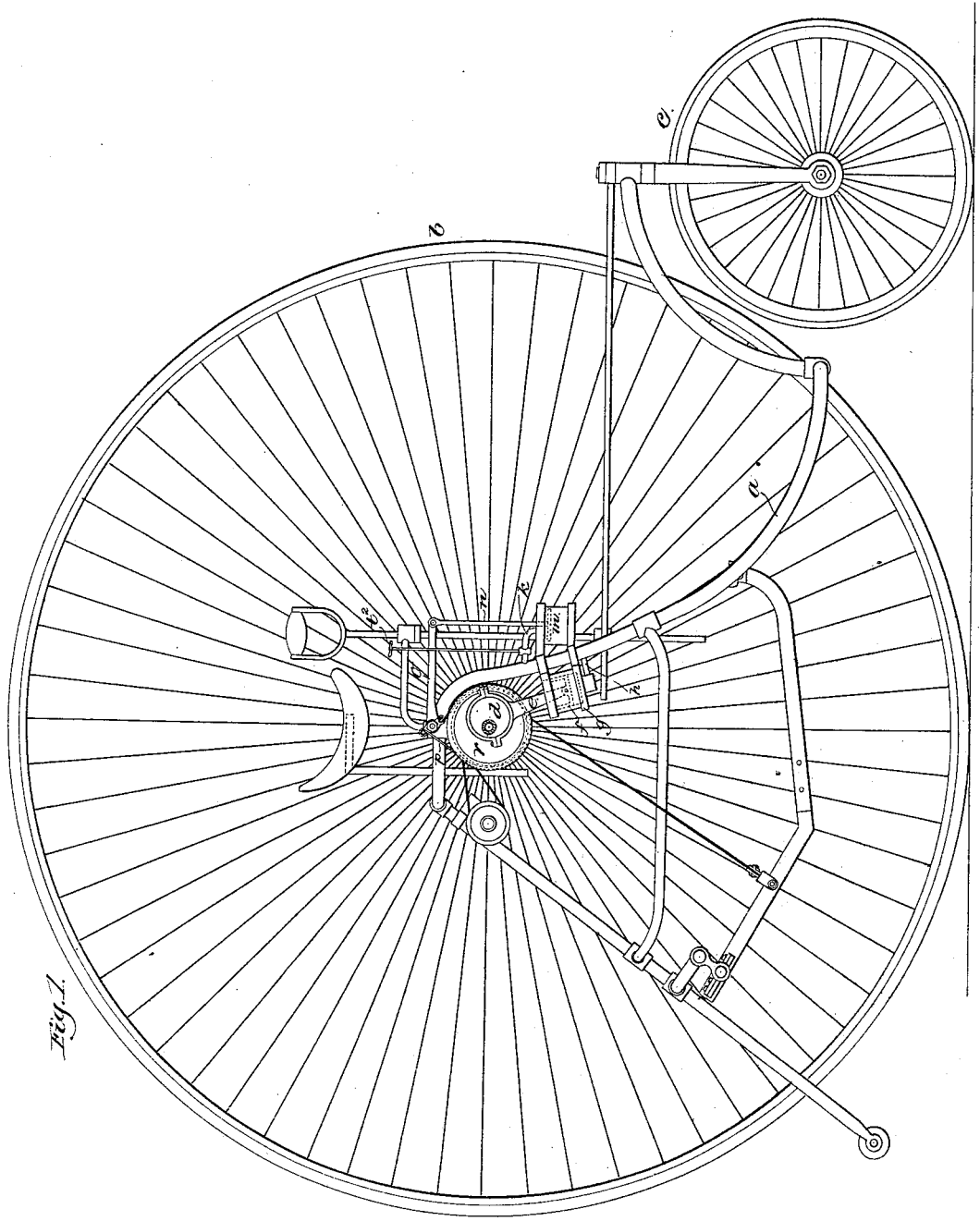

(No Model.)
2 Sheets—Sheet 1.

E. P. HOWE.
AUTOMATIC BRAKE FOR VELOCIPEDES.

No. 330,027.    Patented Nov. 10, 1885.

Witnesses.
John F. C. Prinklerk
Jas. H. Lang

Inventor.
Edward P. Howe.
by Crosby & Gregory attys.

(No Model.)  2 Sheets—Sheet 2.
E. P. HOWE.
AUTOMATIC BRAKE FOR VELOCIPEDES.
No. 330,027. Patented Nov. 10, 1835.
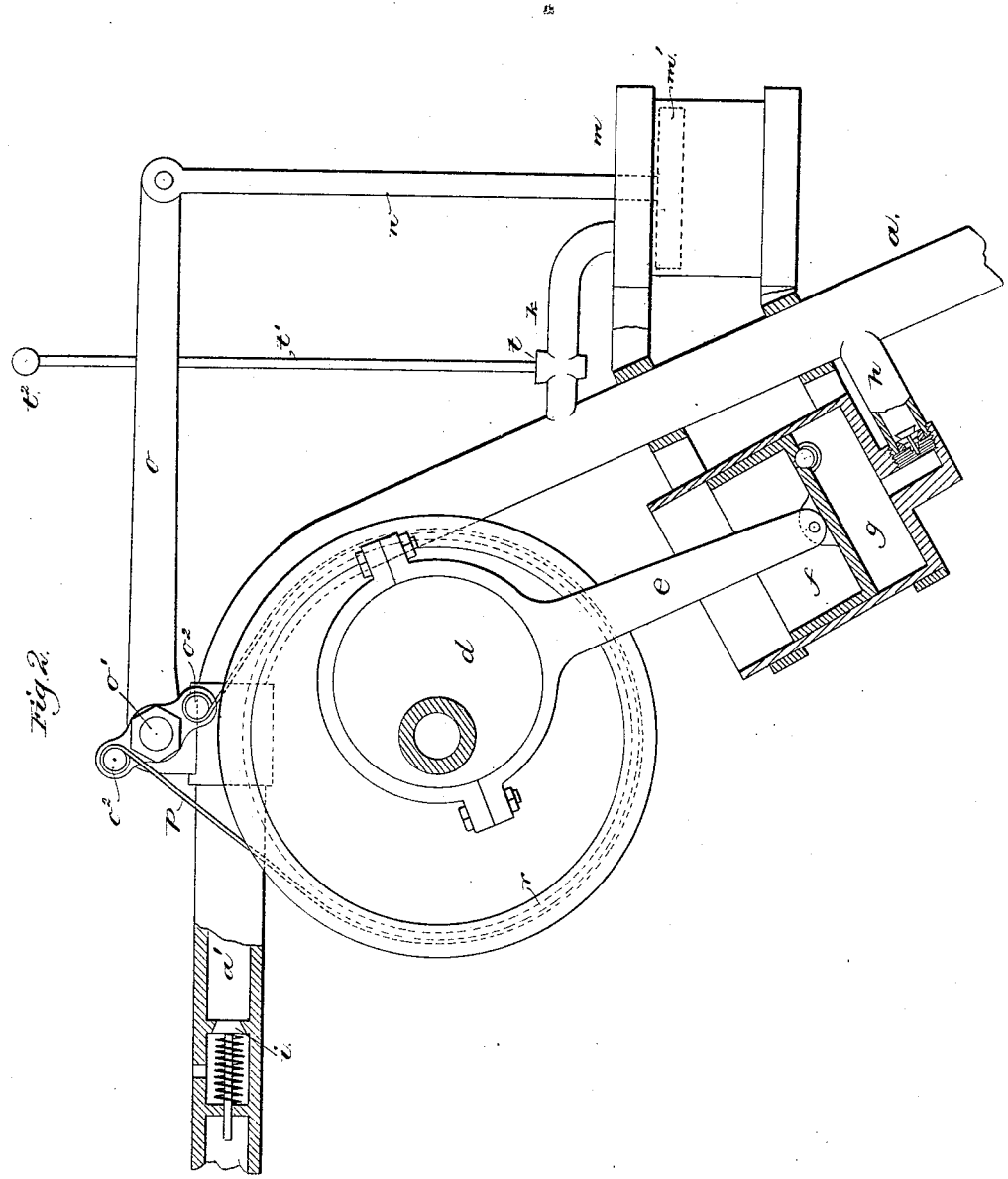

UNITED STATES PATENT OFFICE.

EDWARD P. HOWE, OF NORTHBOROUGH, ASSIGNOR OF FIVE-EIGHTHS TO CHARLES R. ROGERS AND JOHN J. SHAW, OF PLYMOUTH, MASS.

AUTOMATIC BRAKE FOR VELOCIPEDES.

SPECIFICATION forming part of Letters Patent No. 330,027, dated November 10, 1885.

Application filed May 31, 1884. Renewed August 31, 1885. Serial No. 175,759. (No model.)

*To all whom it may concern:*

Be it known that I, EDWARD P. HOWE, of Northborough, county of Worcester, State of Massachusetts, have invented an Improvement in Automatic Brakes for Velocipedes, of which the following description, in connection with the accompanying drawings, is a specification, like letters on the drawings representing like parts.

My invention, relating to a brake for velocipedes, is shown as applied to a tricycle; and it consists, essentially, of an air-forcing device or pump actuated while the tricycle is in motion to produce an air-pressure, which, through suitable mechanism, acts upon a braking device for the wheel of the vehicle to retard it any usual manner, it being shown in this instance as applied to a band-brake, or one in which a flexible band is drawn tightly around the hub or a drum connected therewith, to produce friction, which will retard the rotation of the said hub and connected vehicle-wheel. The flow of the air may be controlled by a cock or valve, so that by merely turning the said cock the brake may be applied.

The air-forcing device is herein shown as employed to compress air which will act upon a piston connected with the brake.

It is preferable to employ a portion of the tubular frame-work as a reservoir, which will contain the air under pressure until required for the purpose of applying the brake to retard the velocipede.

Figure 1 is a vertical section of a tricycle provided with an automatic brake embodying the invention, and Fig. 2 an enlarged detail of the brake mechanism by itself.

The main frame-work $a$, with the driving-wheel $b$ and its actuating mechanism, and the steering-wheel $c$, may be of any usual construction, the said driving-wheel or its rotating shaft or axle being provided with actuating mechanism, shown as an eccentric, $d$, operating a pitman, $e$, connected with a piston or plunger, $f$, operating in a cylinder, $g$, to compress or force air, which, as shown in Figs. 1 and 2, is delivered through a pipe, $h$, into a portion of the tubular frame-work, $a$, which portion thus constitutes a reservoir, $a'$, for the compressed air, and is provided with a safety-valve, $i$, which permits the air to escape when its pressure reaches a certain point. The air thus compressed in the frame-work $a$ may be delivered through a pipe, $k$, into a cylinder, $m$, where it will act on a piston, $m'$, (shown in dotted lines, Figs. 1 and 2,) connected by a rod, $n$, with the braking device $o$, shown as a lever pivoted at $o'$ upon the frame-work, and provided with studs, $o^2$, connected with the opposite ends of the brake-band $p$, surrounding and adapted to press against the hub or drum $r$, fixed upon the axle or otherwise connected with the driving-wheel of the vehicle.

The admission of the air through the pipe $k$ to the cylinder $m$ for the purpose of applying the brake may be controlled by a cock, $t$, having a stem, $t'$, provided with a handle, $t^2$, in proper position to be easily accessible to the rider. The said cock $t$ may be a three-way cock of usual construction, so that when in one position it will permit the passage of air from the reservoir $a'$ into the cylinder $m$, and when in another position will shut off the escape of air from the said reservoir $a'$, but permit the air to escape from the cylinder $m$, thus relieving the pressure on the brake and leaving the vehicle free to run.

When, as is common in velocipedes, the driving-wheel is positively connected with some other moving part, as with a rotating pedal-shaft, it is obvious that the air-pump might be actuated from such part, or that the retarding device might act upon it, and such arrangement would be the equivalent of that herein shown and described.

In another application filed by me August 31, 1885, similar mechanism to that herein described is employed to exhaust a brake-cylinder, thus dispensing with an intermediate reservoir.

I claim—

1. In a velocipede, the combination of the following instrumentalities: an eccentric, means, substantially as described, to rotate it, a cylinder, a piston and piston-rod actuated by the said eccentric, a tank or reservoir carried by the velocipede, a pipe to connect the said cylinder with the tank or reservoir, a controlling-cock in said pipe, a brake-actuating device consisting of a cylinder and piston actuated by fluid-pressure caused by the first-mentioned cylinder, its piston and actuating mechanism, a pipe having an air-controlling cock and connecting the cylinder of the brake-actuating device with the tank or reservoir, and a brake connected with and actuated by the piston of the brake-actuating device, all as set forth.

2. The combination of the frame-work and wheel of a velocipede with an air-forcing device actuated by the said wheel and connected with the said frame-work, which constitutes a reservoir for the compressed air, a braking device actuated by the fluid-pressure, and a cock controlling its operation, substantially as described.

3. The wheel and tubular frame-work of a velocipede and an eccentric and pitman actuated by said wheel, combined with an air-forcing device delivering compressed air into the said frame-work, and a cylinder and piston thereon actuated by the said compressed air, and braking device actuated by the said piston, substantially as described.

In testimony whereof I have signed my name to this specification in the presence of two subscribing witnesses.

EDWARD P. HOWE.

Witnesses:
  JOS. P. LIVERMORE,
  W. H. SIGSTON.